(12) United States Patent
Rydén et al.

(10) Patent No.: US 10,721,015 B2
(45) Date of Patent: Jul. 21, 2020

(54) METHODS FOR IMPROVED RECEPTION OF POSITIONING REFERENCE SIGNALS

(71) Applicant: Telefonaktiebolaget LM Ericsson (publ), Stockholm (SE)

(72) Inventors: Henrik Rydén, Solna (SE); Fredrik Gunnarsson, Linköping (SE); Sara Modarres Razavi, Linköping (SE); Ali Zaidi, Norrköping (SE); Meng Wang, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 92 days.

(21) Appl. No.: 16/083,090

(22) PCT Filed: Apr. 20, 2016

(86) PCT No.: PCT/SE2016/050347
§ 371 (c)(1),
(2) Date: Sep. 7, 2018

(87) PCT Pub. No.: WO2017/184043
PCT Pub. Date: Oct. 26, 2017

(65) Prior Publication Data
US 2019/0068315 A1    Feb. 28, 2019

(51) Int. Cl.
*H04L 1/00* (2006.01)
*H04B 7/0456* (2017.01)
(Continued)

(52) U.S. Cl.
CPC ............ *H04L 1/0009* (2013.01); *G01S 1/042* (2013.01); *G01S 1/20* (2013.01); *G01S 5/00* (2013.01);
(Continued)

(58) Field of Classification Search
CPC ... H04L 1/0009; H04L 5/0023; H04L 5/0092; H04L 5/0048; H04W 4/02; H04W 64/00;
(Continued)

(56) References Cited

U.S. PATENT DOCUMENTS

| 2009/0075686 A1* | 3/2009 | Gomadam | ............ H04B 7/0417 455/500 |
| 2015/0098411 A1* | 4/2015 | Jongren | ................ H04L 5/0073 370/329 |

(Continued)

FOREIGN PATENT DOCUMENTS

| EP | 2685755 A1 | 1/2014 |
| EP | 2797347 A1 | 10/2014 |
| WO | 2011003030 A1 | 1/2011 |

OTHER PUBLICATIONS

European Office Action for European Patent Application No. 16899594.2 dated Apr. 10, 2019, 7 pages.
(Continued)

*Primary Examiner* — Curtis A Alia
(74) *Attorney, Agent, or Firm* — Sage Patent Group

(57) ABSTRACT

A Radio Network Node (RNN) and a method for enabling an improved reception of Positioning Reference Signals (PRSs) at a communications device. The RNN and the communications device are operable in a wireless communications network. The RNN selects a first precoder and a second precoder for forming a first beam and a second beam, respectively, and obtains a precoding switching pattern relating to when the first precoder is to be applied to one or more first PRS symbols and when the second precoder is to be applied to one or more second PRS symbols. Further, the RNN transmits, to the communications device, the one or more first PRS symbols to which the first precoder is applied; and in accordance with the obtained precoding switching pattern, the RNN transmits, to the communica- (Continued)

tions device, the one or more second PRS symbols to which the second precoder is applied.

18 Claims, 11 Drawing Sheets

(51) Int. Cl.
*H04L 5/00* (2006.01)
*G01S 5/00* (2006.01)
*G01S 1/04* (2006.01)
*G01S 1/20* (2006.01)
*H04W 4/02* (2018.01)
*H04B 7/06* (2006.01)
*H04W 64/00* (2009.01)

(52) U.S. Cl.
CPC ......... *H04B 7/0456* (2013.01); *H04B 7/0602* (2013.01); *H04L 5/0023* (2013.01); *H04L 5/0048* (2013.01); *H04L 5/0092* (2013.01); *H04W 4/02* (2013.01); *H04W 64/00* (2013.01)

(58) Field of Classification Search
CPC ... G01S 1/20; G01S 1/042; G01S 5/00; H04B 7/0602; H04B 7/0456
See application file for complete search history.

(56) References Cited

U.S. PATENT DOCUMENTS

| | | | | |
|---|---|---|---|---|
| 2015/0373682 | A1* | 12/2015 | Bashar | H04W 48/16 370/330 |
| 2016/0006553 | A1* | 1/2016 | Kim | H04L 1/1671 370/252 |
| 2018/0048364 | A1* | 2/2018 | Girnyk | H04B 7/0639 |

OTHER PUBLICATIONS

Author Unknown, "Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 13)," Technical Specification 29.171, Version 13.2.0, 3GPP Organizational Partners, Mar. 2016, 54 pages.

Author Unknown, "Technical Specification Group Core Network and Terminals; Location Services (LCS); Evolved Jacket Core (EPC) LCS Protocol (ELP) between the Gateway Mobile Location Centre (GMLC) and the Mobile Management Entity (MME); SLg interface (Release 13)," Technical Specification 29.172, Version 13.0.0, 3GPP Organizational Partners, Dec. 2015, 40 pages.

Author Unknown, "Technical Specification Group Radio Access Network; Evolved Universal Terrestrial Radio Access (E-UTRA); Radio Resource Control (RRC); Protocol Specification (Release 13)," Technical Specification 36.331, Version 13.1.0, 3GPP Organizational Partners, Mar. 2016, 551 pages.

Author Unknown, "Technical Specification Group Radio Access Network; Evolved Universal Terrestrial Radio Access (E-UTRA); LTE Positioning Protocol (LPP) (Release 13)," Technical Specification 36.355, Version 13.1.0, 3GPP Organizational Partners, Mar. 2016, 141 pages.

Author Unknown, "Technical Specification Group Radio Access Network; Evolved Universal Terrestrial Radio Access (E-UTRA); LTE Positioning Protocol A (LPPa) (Release 13)," Technical Specification 36.455, Version 13.1.0, 3GPP Organizational Partners, Mar. 2016, 61 pages.

International Search Report and Written Opinion for International Patent Application No. PCT/SE2016/050347, dated Dec. 22, 2016, 11 pages.

* cited by examiner

Figure 6 Method performed by RNN 508

Figure 10 Method performed by communications device 506

METHODS FOR IMPROVED RECEPTION OF POSITIONING REFERENCE SIGNALS

This application is a 35 U.S.C. § 371 national phase filing of International Application No. PCT/SE2016/050347, filed Apr. 20, 2016, the disclosure of which is incorporated herein by reference in its entirety.

TECHNICAL FIELD

Embodiments herein relate generally to a Radio Network Node (RNN), a communications device and to methods therein. In particular, embodiments relate to improved reception of Positioning Reference Signals (PRS).

BACKGROUND

Communication devices such as terminals are also known as e.g. User Equipments (UE), mobile terminals, stations (STAs), wireless devices, wireless terminals and/or mobile stations. Communications devices are enabled to communicate wirelessly in a wireless communications network, such as a Wireless Local Area Network (WLAN), or a cellular communications network sometimes also referred to as a cellular radio system or cellular networks. The communication may be performed e.g. between two communications devices, between a communications device and a regular telephone and/or between a communications device and a server via an access network and possibly one or more core networks, comprised within the wireless communications network.

The above communications devices may further be referred to as mobile telephones, cellular telephones, laptops, or tablets with wireless capability, just to mention some further examples. The communications devices in the present context may be, for example, portable, pocket-storable, hand-held, computer-comprised, or vehicle-mounted mobile devices, enabled to communicate voice and/or data, via the access network, such as a Radio Access Network (RAN), with another entity, such as another terminal or a server.

The communications network covers a geographical area which is divided into geographical subareas, such as coverage areas, cells or clusters. In a cellular communications network each cell area is served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB, micro eNode B or pico base station, based on transmission power, functional capabilities and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the communications devices within range of the base stations. In the context of this disclosure, the expression Downlink (DL) is used for the transmission path from the base station to the communications device. The expression Uplink (UL) is used for the transmission path in the opposite direction i.e. from the communications device to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Location-based services and emergency call positioning drive the development of positioning in the wireless communications networks. A positioning support in the Third Generation Partnership Project Long Term Evolution (3GPP LTE) was introduced in Release 9. This positioning support enables operators to retrieve position information for location-based services and to meet regulatory emergency call positioning requirements.

Positioning in an LTE communications network is supported by a network architecture schematically illustrated in FIG. 1. As illustrated, the network architecture supports direct interactions between a communications device, e.g. a UE, and a network node, e.g. a location server such as an Evolved-Serving Mobile Location Centre (E-SMLC), via a positioning protocol such as an LTE Positioning Protocol (LPP). Moreover, the network architecture supports interactions between the location server, e.g. the E-SM LC, and a Radio Network Node, e.g. an eNodeB, via an LPPa protocol. The interactions between the E-SMLC and the eNodeB may to some extent be supported by interactions between the eNodeB and the UE via a Radio Resource Control (RRC) protocol.

Four positioning techniques are considered in LTE, and they will be briefly described below.

A first positioning technique is based on an Enhanced Cell ID. Essentially, cell ID information is used to associate the communications device to a serving area of a serving cell, and then additional information is used to determine a finer granularity position.

A second positioning technique is based on an Assisted Global Navigation Satellite System (GNSS). GNSS information is retrieved by the communications device, and is supported by assistance information provided to the communications device from the E-SM LC to determine a position of the communications device.

A third positioning technique is based on an Observed Time Difference of Arrival (OTDOA). The communications device estimates a time difference of reference signals received from different eNodeBs and sends the estimated time differences to the E-SM LC for multilateration.

A fourth positioning technique is based on an Uplink Time Difference of Arrival (UTDOA). The communications device is requested to transmit a specific waveform that is detected by multiple location measurement units, e.g. multiple eNodeBs, at known positions. These measurements are forwarded to the E-SMLC for multilateration.

Global Positioning System (GPS)-enabled communications devices may meet the requirement for positioning, but the GPS may not provide the required availability due to the satellite signals being blocked in urban and/or indoor environments. Therefore, other techniques are needed in such environments. The OTDOA has been introduced in the 3GPP release 9 as a downlink (DL) positioning method. As schematically illustrated in FIG. 2, the OTDOA in LTE is based on the communications device measuring the Time Of Arrival (TOA) of signals received from the eNodeBs. The communications device measures the relative difference between a reference cell and another specific cell, defined as a Reference Signal Time Difference (RSTD) measurement. Every such RSTD determines a hyperbola and the intersection point of these hyperbolas may be considered as the position of the communications device. Here, the reference cell is selected by the communications device and the RSTD measurement may be performed on an intra-frequency cell or on an inter-frequency cell. By the expression "an intra-frequency cell" when used herein is meant that the reference cell and/or a neighbour cell is on the same carrier frequency as the serving cell. Further, by the expression "an inter-frequency cell" when used in this disclosure is meant that at least one of reference cell and the neighbour cell is on a different carrier frequency from the serving cell.

It is possible to measure the RSTD on any downlink signals e.g., on a Cell-specific Reference Signal (CRS). However, in the OTDOA the communications device is required to detect multiple neighbour-cell signals, and these signals may suffer from poor hearability. Hence, Positioning Reference Signals (PRSs) have been introduced to improve the OTDOA positioning performance.

FIGS. 3A and 3B schematically show the arrangement of the PRS assigned resource elements, denoted with $R_6$, for PRS subframes using a normal Cyclic Prefix (CP). Further, the FIGS. 3A and 3B schematically show the mapping using one and two Physical Broadcast Channel (PBCH) antenna ports and four PBCH antenna ports, respectively. As illustrated in FIGS. 3A and 3B, the number of PRS resources in a PRS subframe vary depending on the configuration of the number of PBCH antenna ports and what cyclic prefix is used.

FIGS. 4A and 4B schematically show the arrangement of the PRS assigned resource elements, denoted with $R_6$, for PRS subframes using an extended CP. Further, the FIGS. 4A and 4B schematically show the mapping using one and two PBCH antenna ports and four PBCH antenna ports, respectively. As illustrated in FIGS. 4A and 4B, the number of PRS resources in a PRS subframe vary depending on the configuration of the number of PBCH antenna ports and what cyclic prefix is used.

A PRS subframe may comprise positioning reference signal, downlink control information, and Cell specific Reference Signal (CRS). However, the PRS subframe does not comprise any data symbols. Basically, the resource elements that may be used for data transmission are left unused in the PRS subframe in order to reduce interference between different networks during transmission of the PRS subframes. This improves hearability, i.e., the PRS may be heard or detected more easily if there is less interference.

Thus, in order to reduce the interference with neighbour cells in the PRS subframe, no Physical Downlink Shared Channel (PDSCH) data is carried. The Physical Downlink Control Channel (PDCCH) and the CRSs are retained in the PRS subframe, while PRSs $R_6$ are distributed in a "diagonal" way in between the CRSs. In FIGS. 3A, 3B and 4A, 4B the CRSs are not shown, although they are always present in PRS subframes. Similar to the CRS, a cell-specific frequency shift is applied to the PRS pattern, thereby avoiding time-frequency PRS collisions with up to six neighbours cells. The cell-specific frequency shift may be given by a Physical Cell ID (PCI) modulo 6.

In an LTE system, two or more consecutive PRS subframes, a.k.a. positioning occasions, are transmitted periodically in the downlink. One positioning occasion may comprise up to six consecutive PRS subframes. The time period of one positioning occasion may be configured to every $T_{PRS}$=160, 320, 640 and 1280 milliseconds. It should be noted that, in a Time Division Duplexing (TDD) mode, an uplink subframe and other special frames may not comprise PRSs. Another parameter to characterize the PRS transmission schedule is the cell specific subframe offset, which defines the starting subframe of the PRS transmission relative to a Subframe Number (SFN) equal to 0. As shown in Table 1 below, the PRS periodicity $T_{PRS}$ and the subframe offset $\Delta_{PRS}$ are derived from the PRS Configuration Index $I_{PRS}$.

TABLE 1

| PRS subframe configuration | | |
|---|---|---|
| PRS configuration Index $I_{PRS}$ | PRS periodicity $T_{PRS}$ (subframes) | PRS subframe offset $\Delta_{PRS}$ (subframes) |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | | Reserved |

In some cases, and in particular in cases of dense deployment, it may not be sufficient to only use cell-specific frequency shift in order to avoid interference from neighbour cells. Therefore, PRS muting has been introduced to further reduce inter-cell interference by muting PRS transmission in other cells based on a periodical muting pattern. By the expression "dense deployment" when used in this disclosure is meant that a large number of base stations, e.g. eNBs, are present in a certain geographical area. Note that only PRS of up to six base stations may use orthogonal time and/or frequency resources according to the PRS specified in LTE, if muting is not used. The PRS muting configuration of a cell is defined by a periodic muting sequence with a periodicity of $T_{REP}$, where $T_{REP}$ counted in number of PRS positioning occasions may be 2, 4, 8, or 16. Correspondingly, the PRS configuration is represented by a bit string of length 2, 4, 8, or 16.

Use of multi-antenna techniques may increase the cell hearability. By the expression "cell hearability" when used in this disclosure is meant an improved detectability of the PRS transmitted from a cell, e.g. a base station, and received by a communications device, e.g. a UE. A PRS transmitted from the base station will be unheard if it is not detected by the communications device, i.e. when the signal quality of the PRS transmitted from the base station is insufficient. A PRS will be heard poorly if it is detected but the received PRS is very noisy, which would result in an inaccurate Time of Arrival (TOA) estimate. By spreading the total transmission power wisely over multiple transmit antennas, an array gain may be achieved which increases the signal quality at a receiver, e.g. the communications device. The transmitted signal from each transmit antenna is formed in such way that the received signal from each antenna adds up coherently at the receiver. This is referred to as beam-form ing. Precoding describes how to form each antenna in the antenna array in order to form a beam. In other words, precoding controls the phase and relative amplitude of the signal at each transmit antenna in order to create a pattern of constructive and destructive interference in the wavefront. Precoding may be separated into analog and digital precoding. Analog precoding means that antenna elements are combined with connecting circuity to form a physical antenna. Thus, the mapping between the input of the physical antenna to the different antenna elements is referred to as an analog precoder. Digital precoding means that weights may be assigned to map signal components from logical antenna ports to the physical antennas. A codebook is a set of precoding vectors, each of which precoding vector is used to control the transmit antennas in the antenna array to form the beam. Sometimes the precoding vectors are referred to as beam-forming vectors. Typically, the codebook lists precoding vectors for digital precoding, while the analog precoding is designed as part of the design of the physical antenna. One digital precoder alternative is based on a selection of an analog precoder, which means that the digital precoding vector comprises a 1 corresponding to the selected physical antenna, and 0 for the rest of the available physical antennas. In general, general digital precoding weights can be considered between the antenna ports and the physical antennas.

A different perspective is to consider the combination of a digital and an analog precoder and corresponding codebooks as one precoder with a corresponding codebook. In this case, there is one joint mapping from each antenna port to each individual antenna elements, and one codebook listing all available mappings between antenna ports and antenna elements.

In an LTE positioning system, a cell-specific frequency shift, for example given by PCI modulo 6, i.e. mod(PCI,6), is applied to a PRS pattern, which helps to avoid time-frequency PRS collision from up to six neighbour cells. However, even in a properly planned communications network in respect to mod(PCI,6), two or more cells will always create interference towards each other since only up to six cells may use orthogonal time and/or frequency resources for the transmission of PRS according to the current LTE specification, and this interference is static besides a fast-fading component which is due to the time variant nature of the channel between the base station and the communications device. In other words, the fast-fading component may due to that the channel between the base station and the communications device may vary over time. Consequently, a neighbour cell may not be heard due to a colliding PRS pattern, and this may be the case for the complete positioning measurement time, e.g. for an LPP response time period. By removing the static property of the interference, the probability of more hearable neighbour cells during the complete positioning measurement time increases. By the expressions "interference is static" and "static interference" when used in this disclosure is meant that the interference situation at the communications device is not changing over time. If the interference is not static, there will be some instances with lower interference and some instances with higher interference. The instances with lower interference will provide an opportunity to receive PRS with less interference, leading to an improved TOA estimation. One way of reducing the interference from colliding PRS patterns is to apply a muting pattern. However, muting leads to resource waste in the sense that some time and/or frequency resources are not used for any PRS or data transmission in the muted cell.

Further, in the prior art networks the PRS may be transmitted in a direction advantageous for the performance of some communications devices while being disadvantageous for the performance of other communications devices.

SUMMARY

An object of embodiments herein is to address at least some of the above-mentioned drawbacks among others and to improve the performance in a communications network.

According to one aspect of embodiments herein, the object is achieved by a method performed by an RNN for enabling an improved reception of Positioning Reference Signals (PRSs) at a communications device. The RNN and the communications device are operating in a wireless communications network.

The RNN selects a first precoder and a second precoder for forming a first beam and a second beam, respectively.

Further, the RNN obtains a precoding switching pattern relating to when the first precoder is to be applied to one or more first PRS symbols and when the second precoder is to be applied to one or more second PRS symbols.

Furthermore, the RNN transmits, to the communications device, the one or more first PRS symbols to which the first precoder is applied.

Yet further, in accordance with the obtained precoding switching pattern, the RNN transmits, to the communications device, the one or more second PRS symbols to which the second precoder is applied.

According to another aspect of embodiments herein, the object is achieved by a Radio Network Node (RNN) for enabling an improved reception of Positioning Reference Signals (PRSs) at a communications device. The RNN and the communications device are operable in a wireless communications network.

The RNN is configured to select a first precoder and a second precoder for forming a first beam and a second beam, respectively.

Further, the RNN is configured to obtain a precoding switching pattern relating to when the first precoder is to be applied to one or more first PRS symbols and when the second precoder is to be applied to one or more second PRS symbols.

Furthermore, the RNN is configured to transmit, to the communications device, the one or more first PRS symbols to which the first precoder is applied.

Yet further, in accordance with the obtained precoding switching pattern, the RNN is configured to transmit, to the communications device, the one or more second PRS symbols to which the second precoder is applied.

According to another aspect of embodiments herein, the object is achieved by a method performed by a communications device for improved reception of Positioning Reference Signals (PRSs). The RNN and the communications device are operating in a wireless communications network.

The communications device obtains a precoding switching pattern.

Further, by means of the obtained precoding switching pattern, the communications device receives, from the RNN, one or more first PRS symbols to which a first precoder is applied, and one or more second PRS symbols to which a second precoder is applied.

According to another aspect of embodiments herein, the object is achieved by a communications device for improved reception of Positioning Reference Signals (PRSs). The RNN and the communications device are operable in a wireless communications network.

The communications device is configured to obtain a precoding switching pattern.

Further, by means of the obtained precoding switching pattern, receives, from the RNN, the communications device is configured to receive, from the RNN, one or more first PRS symbols to which a first precoder is applied, and one or more second PRS symbols to which a second precoder is applied.

According to another aspect of embodiments herein, the object is achieved by a computer program, comprising instructions which, when executed on at least one processor, causes the at least one processor to carry out the method performed by the RNN.

According to another aspect of embodiments herein, the object is achieved by a computer program, comprising instructions which, when executed on at least one processor, causes the at least one processor to carry out the method performed by the communications device.

According to another aspect of embodiments herein, the object is achieved by a carrier comprising the computer program, wherein the carrier is one of an electronic signal, an optical signal, a radio signal or a computer readable storage medium.

Since the RNN transmits, to the communications device, the one or more first PRS symbols to which the first precoder is applied, and the one or more second PRS symbols to which the second precoder is applied in accordance with the obtained precoding switching pattern, the hearability, e.g. reception, of transmitted PRS symbols at the communications device is improved since the communications device will hear one of the one or more first PRS symbols better than one of the one or more second PRS symbols or vice versa. Thereby, the reception quality of PRS symbols at the communications device is improved. This results in an improved performance in the communications network.

An advantage with embodiments herein is that they enable steering of the energy transmitted from transmit antennas in multiple directions which improves the hearability of the PRS symbols at a receiver, e.g. the communications device, and also reduces the static interference at the communications device. The gains may be achieved by reporting the used precoding switching patterns to the communications device.

Another advantage with embodiments herein is that they enable an improved positioning accuracy since the static interference between two cells with colliding PRS patterns, e.g. PRS symbols, are mitigated by using different precoders during for example an LPP response time interval. This is possible since the precoding switching pattern allows steering energy in multiple directions which improves hearability, and/or since the precoding switching pattern enables possibility of enhancing the Line Of Sight (LOS) path.

BRIEF DESCRIPTION OF DRAWINGS

Examples of embodiments herein are described in more detail with reference to attached drawings in which.

DETAILED DESCRIPTION

Figure 1:
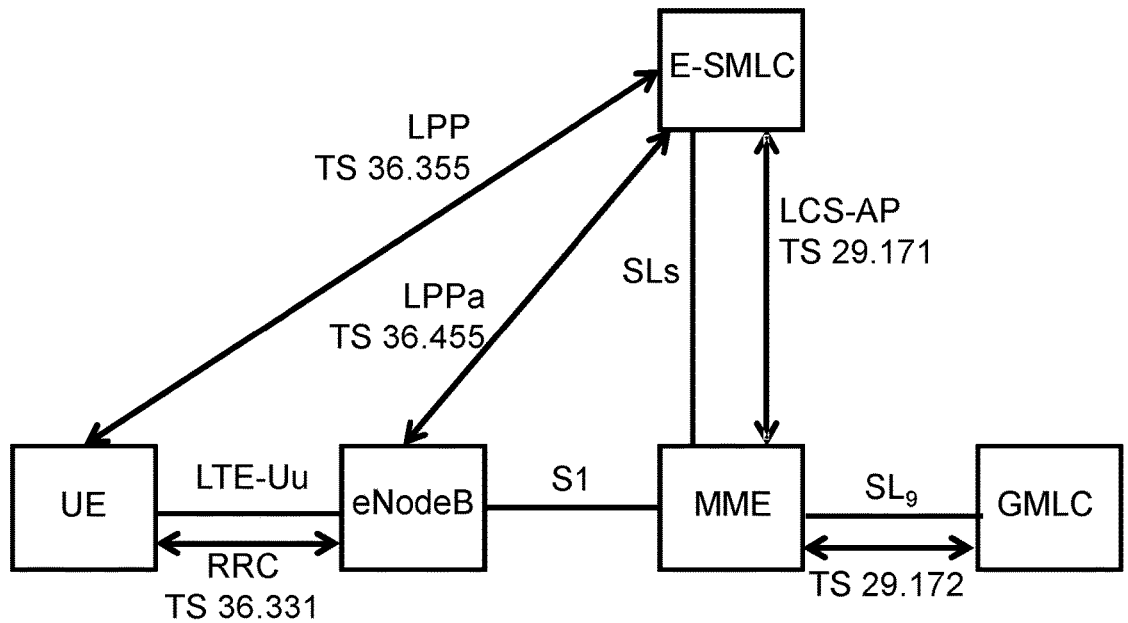
FIG. 1 is a schematic block diagram schematically illustrating an LTE positioning architecture according to prior art.
Figure 2:
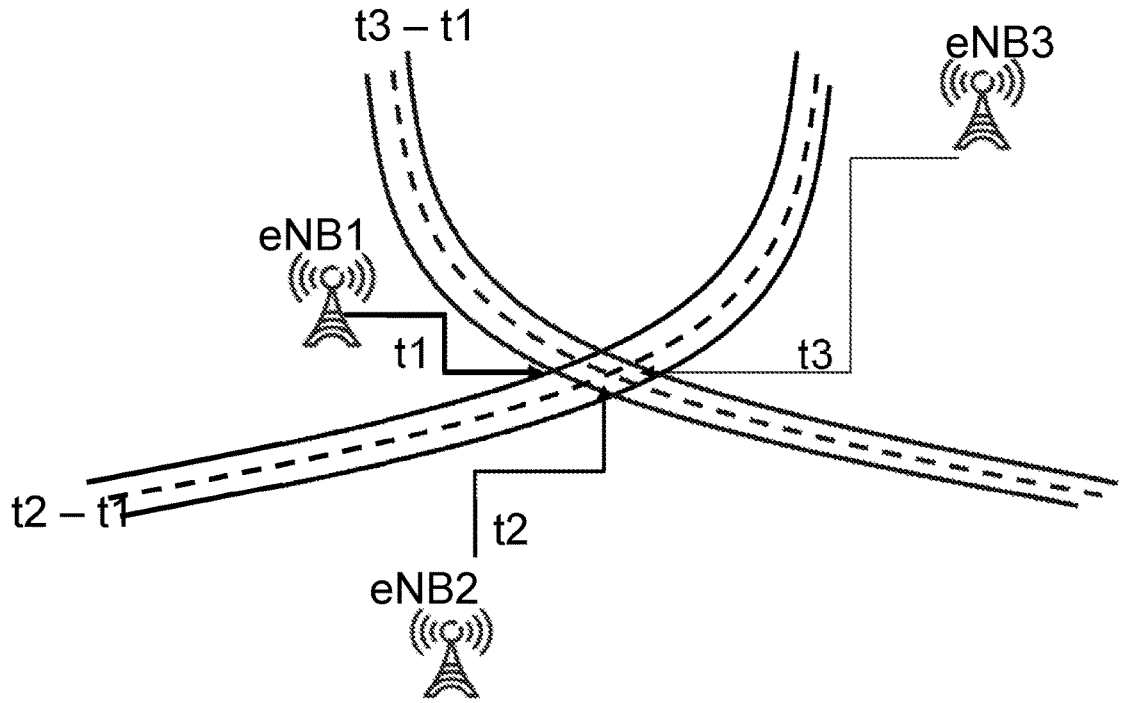
FIG. 2 is a schematic block diagram schematically illustrating an OTDOA position estimation based on multilateration of RSTD measurements according to prior art.

As part of developing embodiments herein, some problems with the state of the art communications networks will first be identified and discussed.

As previously described, in an LTE positioning system, a cell-specific frequency shift, for example given by PCI modulo 6, i.e. mod(PCI,6), is applied to a PRS pattern, which helps to avoid time-frequency PRS collision from up to six neighbour cells. However, even in a properly planned communications network in respect to mod(PCI,6), two or more cells will always create interference towards each other since only up to six cells may use orthogonal time and/or frequency resources for the transmission of PRS according to the current LTE specification. This interference is static besides a fast-fading component which is due to the time variant nature of the channel between the base station and the communications device. Consequently, a neighbour cell may not be heard due to a colliding PRS pattern. This may be the case for the complete positioning measurement time, e.g. for an LPP response time period. By removing the static property of the interference, the probability of more hearable neighbour cells during the complete positioning measurement time increases. One way of reducing the interference from colliding PRS patterns is to apply a muting pattern. However, using muting patterns will cause resource waste since muting implies that the muted resources are not used for any PRS or data transmission.

Further, the PRS is mapped onto antenna port 6 using a static mapping approach. That is, the OFDM symbols are mapped to the antennas using a single precoder during the LPP response time period. Hence, the antenna elements will be directed in a direction beneficial for some communications device, while some communications devices will experience degraded performance by the fixed antenna direction or beam direction given by the single precoder.

As mentioned above, a drawback with the existing solution is the increased use of resources, e.g. the increased number of time-frequency resources required for performing for example positioning determination.

Further, another drawback with the prior art networks is that the PRS may be transmitted in a direction advantageous for the performance of some communications devices while being disadvantageous for the performance of other communications devices.

An object of embodiments herein is therefore to provide an improved performance in a wireless communications network.

The object is achieved by some embodiments herein relating to a Radio Network Node (RNN) for enabling an improved reception of Positioning Reference Signals (PRSs) at a communications device. The RNN transmits to a communications device, one or more first PRS symbols to which a first precoder is applied, and in accordance with an obtained precoding switching pattern, the RNN further transmits to the communications device, one or more second PRS symbols to which a second precoder is applied. The precoding switching pattern relates to when the first precoder is to be applied to the one or more first PRS symbols and when the second precoder is to be applied to the one or more second PRS symbols. By having knowledge about the precoding switching pattern, a communications device may be able to receive one or more of the one or more first PRS symbols and/or one or more second PRS symbols that are transmitted from the RNN.

Note that although terminology from 3GPP LTE is used in this disclosure to exemplify the embodiments herein, this should not be seen as limiting the scope of the embodiments herein to only the aforementioned system. Other wireless systems, including Wideband Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Figure 5:
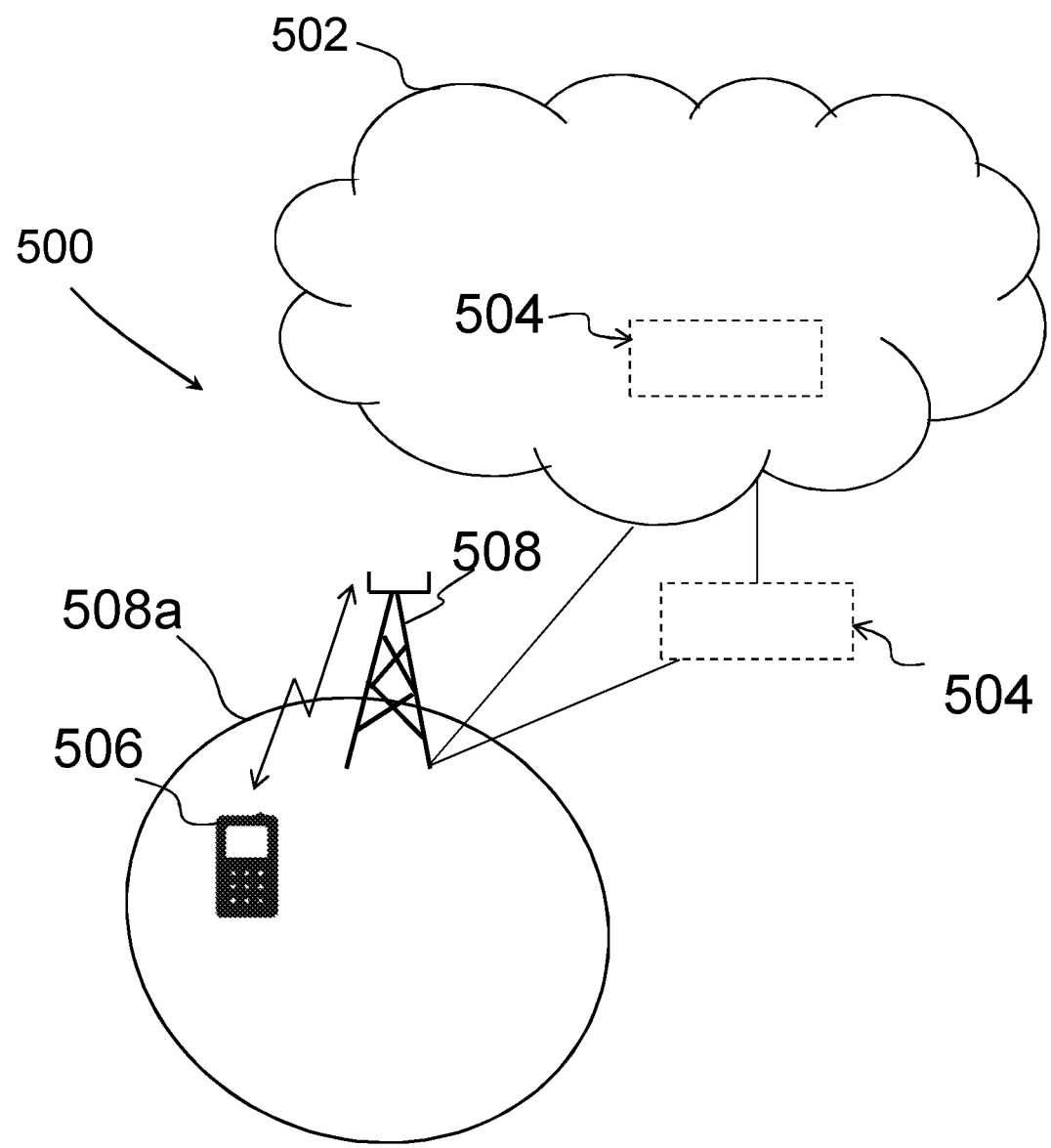
FIG. 5 schematically illustrates embodiments of a wireless communications network.

Embodiments herein relate to a wireless communications network 500 as schematically illustrated in FIG. 5. For example, embodiments herein may be implemented in the wireless communications network 500. The wireless communications network 500 may be a cellular communications network, such as e.g. an LTE network, a WCDMA network, an GSM network, any 3GPP cellular network, Wimax, or any other wireless communications network or system.

A core network 502 may be comprised in the wireless communications network 500. The core network 502 is configured to operate in the wireless communications network 500. The core network 502 may be a wireless core network such as an LTE core network, e.g. an Evolved Packet Core (EPC) network; a WCDMA core network; a GSM core network; any 3GPP core network; WiMAX core network; or any cellular core network.

A network node 504 may be comprised in the wireless communications network 500. In some embodiments, the network node 504 is comprised in the core network 502, and then the network node 504 may be referred to as a core network node. The network node 504 is configured to operate in the wireless communications network 500, e.g. in the core network 502.

The network node 504 may be an Evolved-Serving Mobile Location Centre (E-SMLC), a Mobile Switching Center (MSC), a Mobility Management Entity (MME), an Operation & Maintenance (O&M) node, a Serving GateWay (S-GW), a Serving General Packet Radio Service (GPRS) Node (SGSN), etc.

A communications device 506 operates in the wireless communications network 500. The communications device 506 may be comprised in the wireless communications network 500.

In some embodiments disclosed herein, the non-limiting term UE is used and it refers to any type of communications device communicating with a network node in a communications network. Examples of communications devices are wireless devices, target devices, device to device UEs, machine type UEs or UEs capable of machine to machine communication, Personal Digital Assistants (PDA), iPADs, Tablets, mobile terminals, smart phones, Laptop Embedded Equipped (LEE), Laptop Mounted Equipment (LME), USB dongles etc.

In this disclosure the terms communications device, wireless device and UE are used interchangeably. Further, it should be noted that the term user equipment used in this disclosure also covers other communications devices such as Machine Type of Communication (MTC) device, an Internet of Things (IoT) device, e.g. a Cellular IoT (CIoT) device. Please note the term user equipment used in this document also covers other wireless devices such as Machine to Machine (M2M) devices, even though they do not have any user.

A Radio Network Node (RNN) 508 operates in the wireless communications network 500. The RNN 508 may be comprised in the wireless communications network 500. The RNN 508 may be a radio access node such as a radio base station, for example an eNodeB, also denoted eNB, a Home eNodeB, or a NodeB or any other network node capable to serve a communications device 506 when located within a geographical area 508*a* in a communications network, such as the communications network 500. In this disclosure, the geographical area 508*a* is sometimes referred to as a coverage area, a cell or a cluster wherein the RNN 508 provides radio coverage. Herein, this is also specified as the first RNN 508 manages or is configured to manage communication with the communications devices 506 in the geographical area 508*a*. Sometimes in this disclosure this is also referred to as the RNN 508 is associated with communications device 506 when it is located within the geographical area 508*a*.

Other examples of the RNN 508 are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Radio Remote Units (RRUs), Remote Radio Heads (RRHs), nodes in Distributed Antenna System (DAS) etc.

Figure 6:
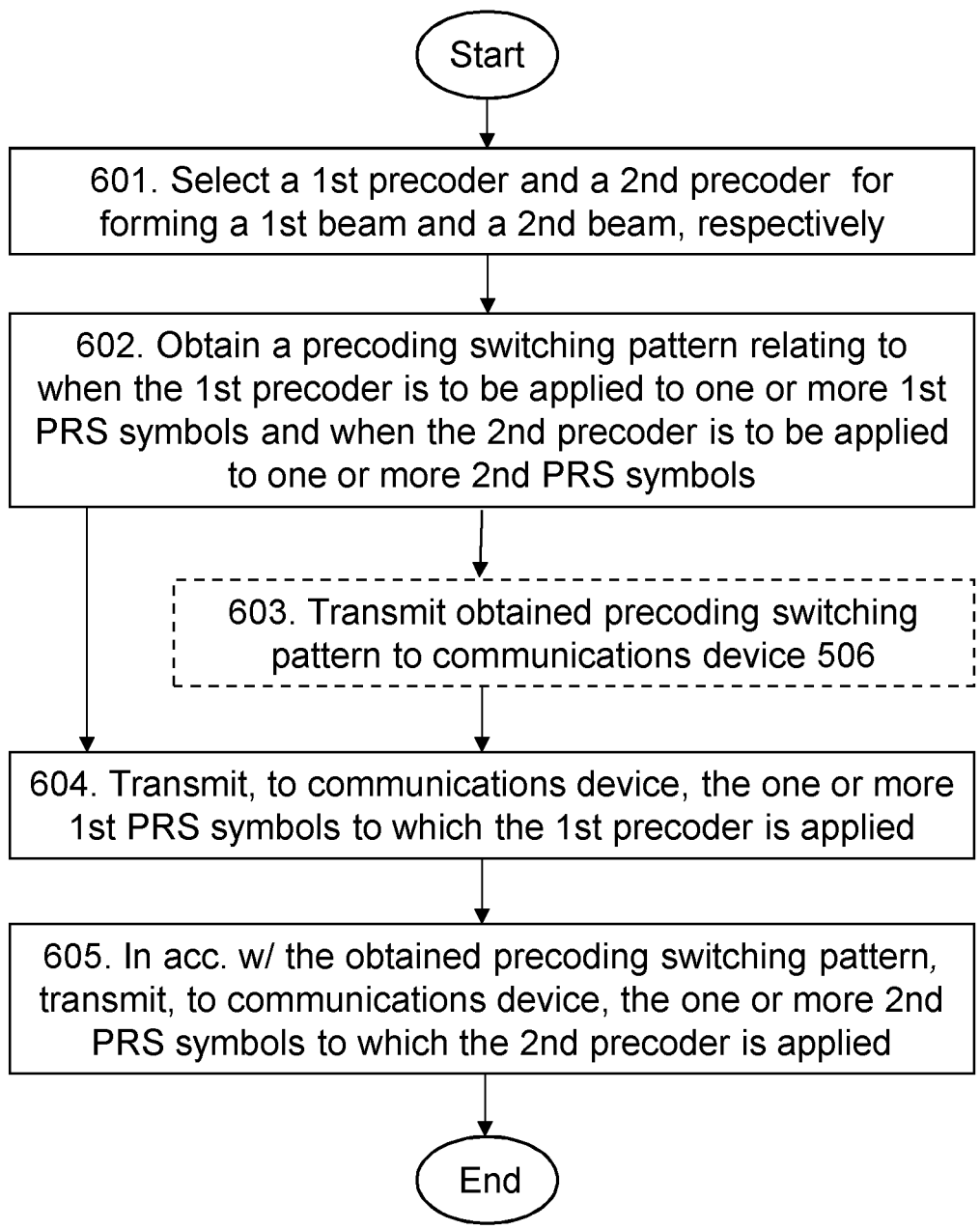
FIG. 6 is a flowchart schematically illustrating embodiments of a method performed by a Radio Network Node.

Examples of methods performed by the RNN 508 for enabling an improved reception of PRSs at the communications device 506 will now be described with reference to flowchart depicted in FIG. 6. The RNN 508 and the communications device 506 are operating in the wireless communications network 500.

The methods comprise one or more of the following actions. It should be understood that these actions may be taken in any suitable order and that some actions may be combined.

Action 601

In order to be able to form different beams having different direction and/or intensity, the RNN 508 selects a first precoder and a second precoder for forming a first beam and a second beam, respectively. The first and second beams may have different directions and/or intensity. Further, it should be understood that the number of precoders selected by the RNN 508 may be more than two, and thus the RNN 508 may select any number of precoders as long as at least two are selected. However, embodiments will in this disclosure be exemplified with the use of the first precoder and of the second precoder.

In order to increase the diversity, the RNN 508 may select the first and second precoders when it is to transmit one or more PRSs. The RNN 508 may select the first and second precoders during an LPP response time interval.

Further, a set of precoders, e.g. the first and second precoders, may be determined based on, for example, optimal precoders corresponding to different sets of existing communications devices. Each such precoder may be determined by reusing a Precoder Matrix Indicator (PMI) feedback or inferring a low and/or high-resolution precoder. A high resolution precoder generates a narrow beam, i.e., the energy is more focused in the spatial domain, and a low resolution precoder generates a wide beam, i.e., the energy is less spread in the spatial domain.

Figures 3A, 3B:
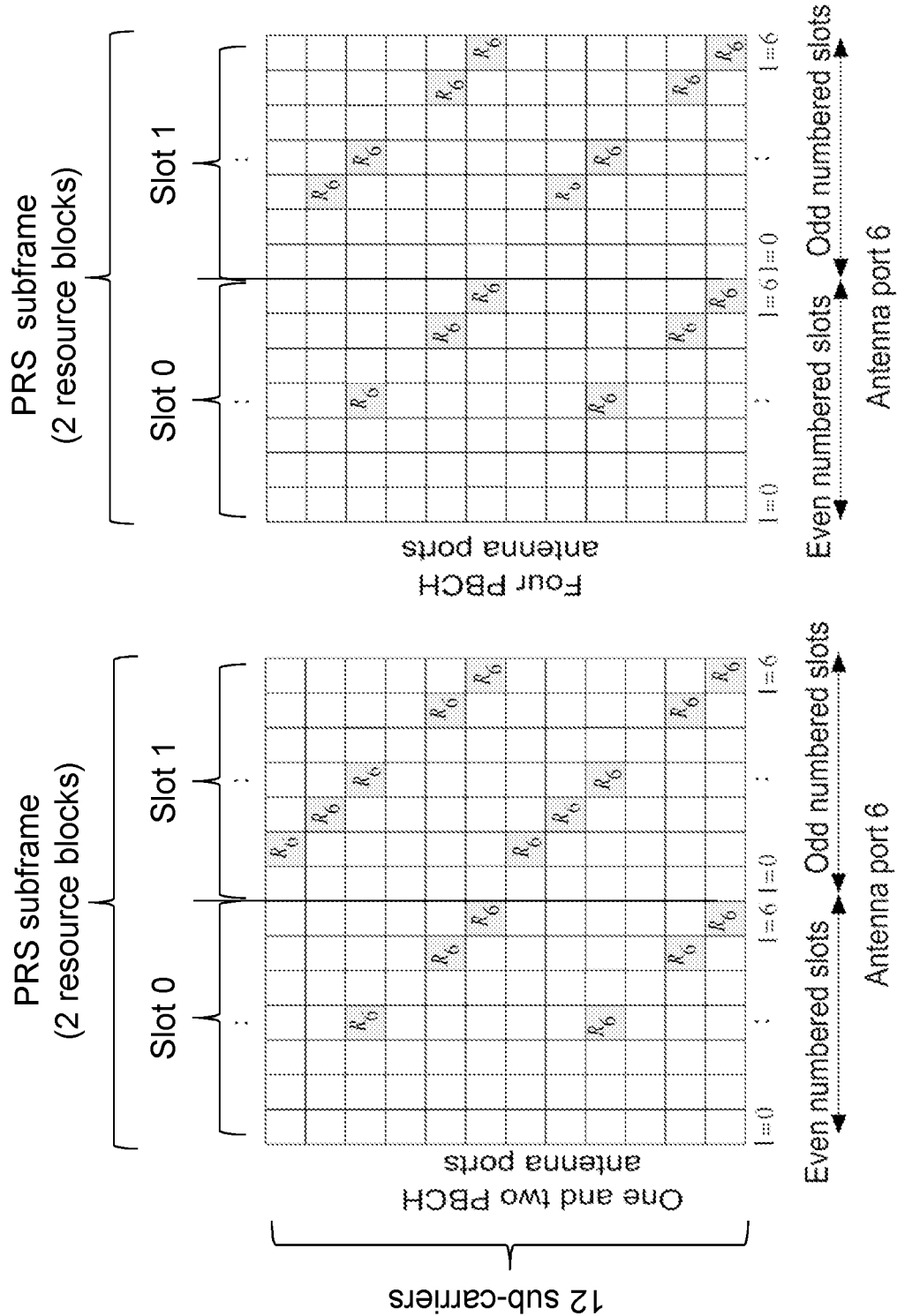
FIGS. 3A and 3B are schematic block diagrams schematically illustrating the arrangement of the PRS assigned resource elements, denoted with $R_6$, for PRS subframes using a normal Cyclic Prefix (CP)
Figures 4A, 4B:
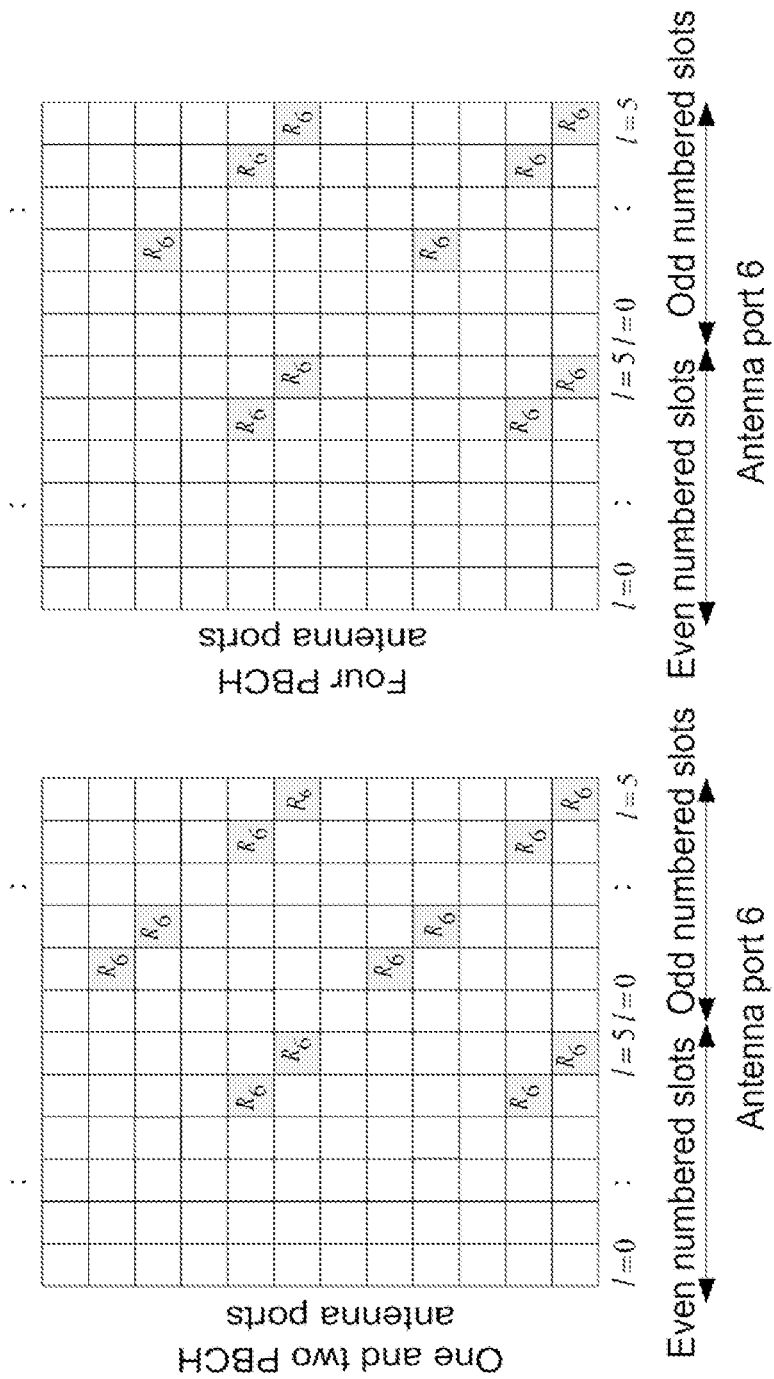
FIGS. 4A and 4B are schematic block diagrams schematically illustrating the arrangement of the PRS assigned resource elements, denoted with $R_6$, for PRS subframes using an extended CP.
Figure 7:
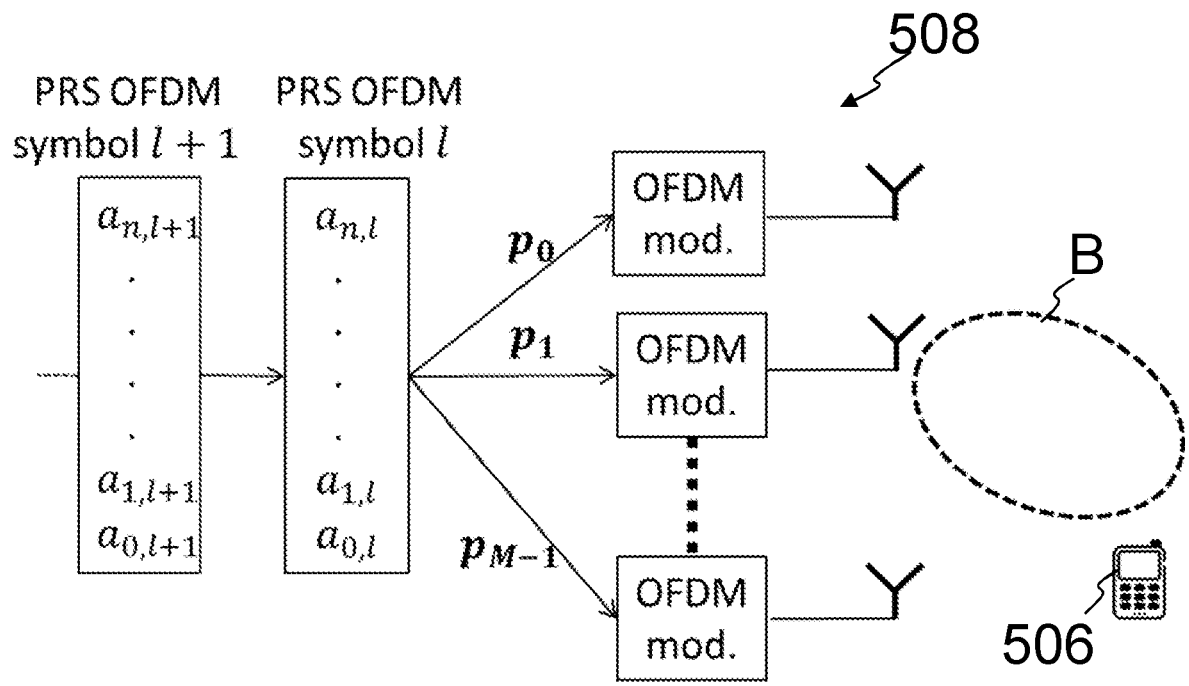
FIG. 7 schematically illustrates precoder based beamforming of PRS.

FIG. 7 schematically illustrates precoder based beamforming of PRS. The PRS is assigned, e.g. mapped, to the resource elements, e.g. OFDM symbols, as depicted in FIGS. 3 and 4. Then, the mapped resources elements are precoded, e.g. by means of the first and second precoders, in order to steer the energy in different directions. This steering is made by applying different phase shifts to the transmitted signals on the different antennas. In FIG. 7, the frequency domain PRS symbols are denoted a. For example, $a_{0,l}$ is the first symbol in the frequency domain and it is located in the l-th OFDM symbol in the PRS subframe. The number of symbols n depends on the number of subcarriers which is proportional to the PRS bandwidth, the number of antenna elements at the transmitter is denoted by M. The precoder $p_m$ of antenna m is of size n×1. The n symbols are precoded for antenna m by applying $p_m$, this may be explained mathematically by the element-wise operation $p_m a$. The frequency domain precoded OFDM symbol is then modulated and transmitted from each antenna and forms a beam B.

In some embodiments, the RNN 508 selects the first and second precoders from a codebook predefined by the wireless communications network 500. For example, this may be the case when the first and second precoders have been standardized and are comprised in the codebook.

Further, the RNN 508 may select the first and second precoders, to be used at an antenna port for forming the first and second beams, to reuse precoders used for another antenna port. For example, this may be the case when the RNN 508 wants to enable to the communications device 506 to combine symbols transmitted from different antenna ports but with the same precoder. This will be described in more detail below in Action 1003.

In some embodiments, the RNN 508 selects the first and second precoders based on precoder information comprised in the RNN 508 and specific for the communications device 506, wherein the precoder information comprises information relating to a precoder to be used in order to optimize data reception at the communications device 506. The precoder information, e.g. a Precoder Matrix Indicator (PMI), may be an indication of the precoder, e.g. the first and/or second precoders, used when beamforming data to a specific communications device, and the indicated precoder, e.g. the first and/or second precoders, may then also be selected as a precoder for transmitting the PRS. The precoder information is thus used for choosing the precoder, e.g. the first and/or second precoders, in order to optimize the reception at the specific communications device.

Alternatively, the RNN 508 may select the first and second precoders based on a respective desired beam width and direction of the formed first and second beams, respectively.

Action 602

The RNN 508 obtains a precoding switching pattern relating to when the first precoder is to be applied to one or more first PRS symbols and when the second precoder is to be applied to one or more second PRS symbols.

The precoding switching pattern is needed since the effective channel at the communications device 506 will change when the precoder switches. The precoding switching pattern is thus needed to indicate the possibility of coherent detection of multiple PRS subframes. By means of the precoding switching pattern, the communications device 506 will be able to receive one or more PRS symbols transmitted from the RNN 508 and to which one or more PRS symbols one or more precoders are applied in accordance with the obtained precoding switching pattern.

The one or more first PRS symbols and the one or more second PRS symbols may be:
- one or more first PRS symbols and one or more second PRS symbols of a single subframe;
- one or more first PRS symbols of one or more first subframes and one or more second PRS symbols of one or more second subframes, respectively; or
- one or more first PRS symbols of one or more first PRS occasions and one or more second PRS symbols of one or more second PRS occasions, respectively.

Figure 8:
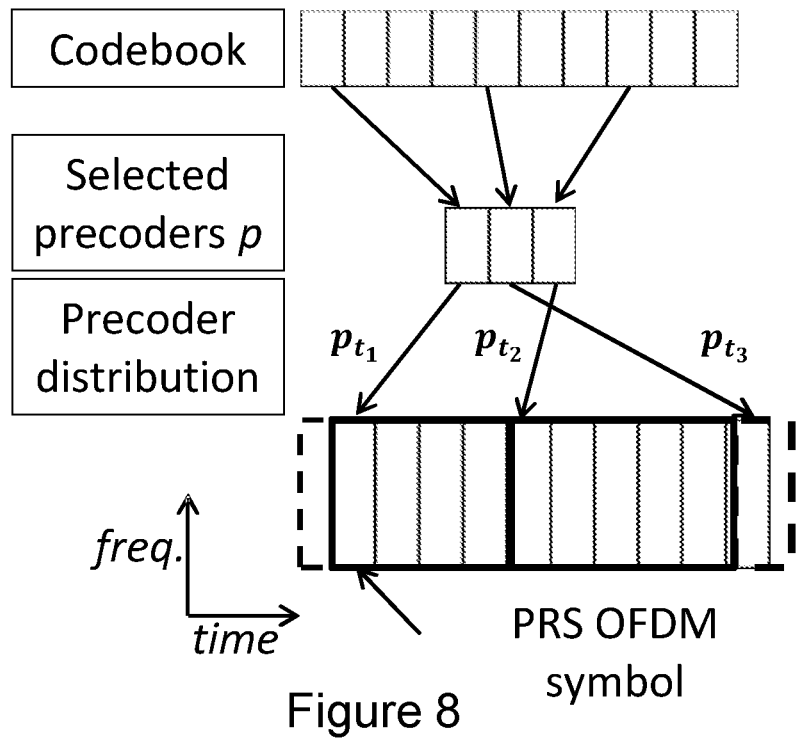
FIG. 8 schematically illustrates the procedure of distributing precoders in time.

A precoding vector $p_t$ comprises information of precoders $p_0, \ldots, p_{M-1}$ at a point of time t, and the precoding switching pattern determines how the precoding vector $p_t$ changes with time. The precoding vector $p_t$ belongs to the set of p precoders, e.g. the first and second precoders, that may be selected from the codebook, i.e. $p_t \in p$. The procedure of distributing the precoders, e.g. the first and second precoders, in time is exemplified in FIG. 8. FIG. 8 schematically shows how the precoding vector $p_{t1}$ at a first point of time t1 is used until a second point of time t2 when a second precoding vector $p_{t2}$ is used until a third point of time t3 when the precoding vector switches to a third precoding vector $p_{t3}$. This distribution of precoders in time may be referred to as the precoding switching pattern.

The precoding switching pattern may comprise information relating to whether or not the first and/or the second precoder for transmitting PRS symbols is used by another antenna port. For example, if another antenna port is using the same precoder as the one used at the antenna port transmitting the PRS symbols, e.g. the antenna port 6, information relating to the another antenna port should be transmitted to the communications device 506 since the communications device 506 may combine, e.g. coherently combine, signals received from two antenna ports. The another antenna port may be an antenna port transmitting CRS symbols, e.g. one or more of the antenna ports 1-4 in LTE.

In some embodiments, the RNN 508 obtains the precoding switching pattern by selecting the precoding switching pattern randomly or based on an order of the first and second precoders in a codebook.

Alternatively, the RNN 508 may obtain the precoding switching pattern by receiving the precoding switching pattern from a network node 504 operating in the wireless communications network 500. As previously described, the network node 504 may be the E-SMLC. For example, the network node 504 may use historic data to determine the optimal precoding switching pattern for maximized cell hearability. Alternatively, if some users, e.g. communications devices such as the communications device 506, are given higher priority for positioning, their optimal precoders may be prioritized when generating the precoder switching pattern.

The precoder set, e.g. the first and second precoders, and/or the precoder switching pattern may also be selected based on one or more of the following information.

Thus, the precoder set, e.g. the first and second precoders, and/or the precoder switching pattern may also be selected based on the deployment scenario, e.g., indoor or outdoor, urban or rural, static or dynamic, number of antenna elements, and possibility of elevation beamforming.

Further, the precoder set, e.g. the first and second precoders, and/or the precoder switching pattern may also be selected based on positioning accuracy requirements for different users or communications devices or services.

Furthermore, the precoder set, e.g. the first and second precoders, and/or the precoder switching pattern may also be selected based on finger printing information available at the communications network 500. The finger printing may be done either manually or by learning over time based on historic data.

The set of precoders, e.g. the first and second precoders, may also be refined over time based on previously estimated positions of communications devices or users or things. For example, one starts with an initial guess and after knowing the rough initial positions, one updates the precoder in order to achieve high accuracy to certain users. It should be noted that the OTDOA method is sometimes a fallback method in the case of not having a clear visibility to at least four satellites. Therefore, scheduling PRS transmissions for communications devices that have access to satellites signals, e.g. GPS signals, may not be of use and this information may be considered when determining precoders.

It is noted that currently the PRSs may be isolated in time, frequency, and code domain. By the use of precoders, it will be possible to isolate them in the spatial domain as well. Thus, the PRS transmission may be optimized in all domains, e.g. in the code, time, frequency, and space domains. Such an optimization may be static or dynamic.

The entire communications network, e.g. the communications network 500, may be coordinated in case of dynamic optimization.

Due to precoder switching, it may be expected that there will be certain delay due to beam scanning. Therefore, the precoder selection and switching may also be based on the acceptable delay or response time.

Action 603

In some embodiments, the RNN 508 transmits the obtained precoding switching pattern to the communications device 506. For example, this may be the case when the RNN 508 wants to inform the communications device 506 about the obtained precoding switching pattern beforehand so the communications device 506 has knowledge about the first and second precoders to be applied and how they are to be applied to the one or more first PRS symbols and the one or more second PRS symbols. However, as will be described below in Action 1001, the communications device 506 may determine the precoding switching pattern by itself and therefore does not need to receive information about it from the RNN 508.

In some embodiments, the RNN 508 transmits the obtained precoding switching pattern to the communications device 506, by transmitting, to the communications device 506, an indication indicating one or more Subframe Numbers (SFNs) at which subframes a switch between the first precoder and the second precoder is to occur.

Alternatively, the RNN 508 may transmit the obtained precoding switching pattern to the communications device 506 by transmitting, to the communications device 506, an indication indicating that the first precoder is to be applied to the one or more first PRS symbols and that the second precoder is to be applied to the one or more second PRS symbols.

The RNN 508 may further transmit, to the communications device 506, the obtained precoding switching pattern using a positioning protocol such as an LTE Positioning Protocol (LPP) and extending the PRS Information Element (IE).

Further, in one embodiment, the precoding switching pattern may be signalled to the communications device 506 comprising the time instances when the precoder switches. The signalling may be dependent by the selected precoding switching pattern and the signalling format should hence take this into account. For example, if the precoder switches on an OFDM symbol level, an indication of the OFDM symbol(s) when the precoder switches may be included. If the precoder switches on a subframe level, it is sufficient to provide an indication of the subframe number(s) when the precoder switches.

The precoding switching pattern may be transmitted using a single bit indicating that the precoder switches in all subframes, or alternatively it may be indicated that the precoder switches in each positioning occasion. The precoding switching pattern may also comprise information whether a standard LTE antenna port is used or not.

Action 604

The RNN 508 transmits, to the communications device 506, the one or more first PRS symbols to which the first precoder is applied. Depending on the direction and intensity of the one or more first PRS symbols the communications device 506 may be able to detect them.

Action 605

In accordance with the obtained precoding switching pattern, the RNN 508 transmits, to the communications device 506, the one or more second PRS symbols to which the second precoder is applied. In order to improve the reception of PRS symbols at the communications device 506, the RNN 508 transmits the one or more PRS symbols to which the second precoder is applied. Thereby, the one or more second PRS symbols may be transmitted in another direction and may have another intensity as compared the transmitted one or more first PRS symbols. Transmitting one or more first PRS symbols and one or more second PRS symbols in different directions and with different intensities may improve the reception of PRS symbols at the communications device 506.

Figure 9:
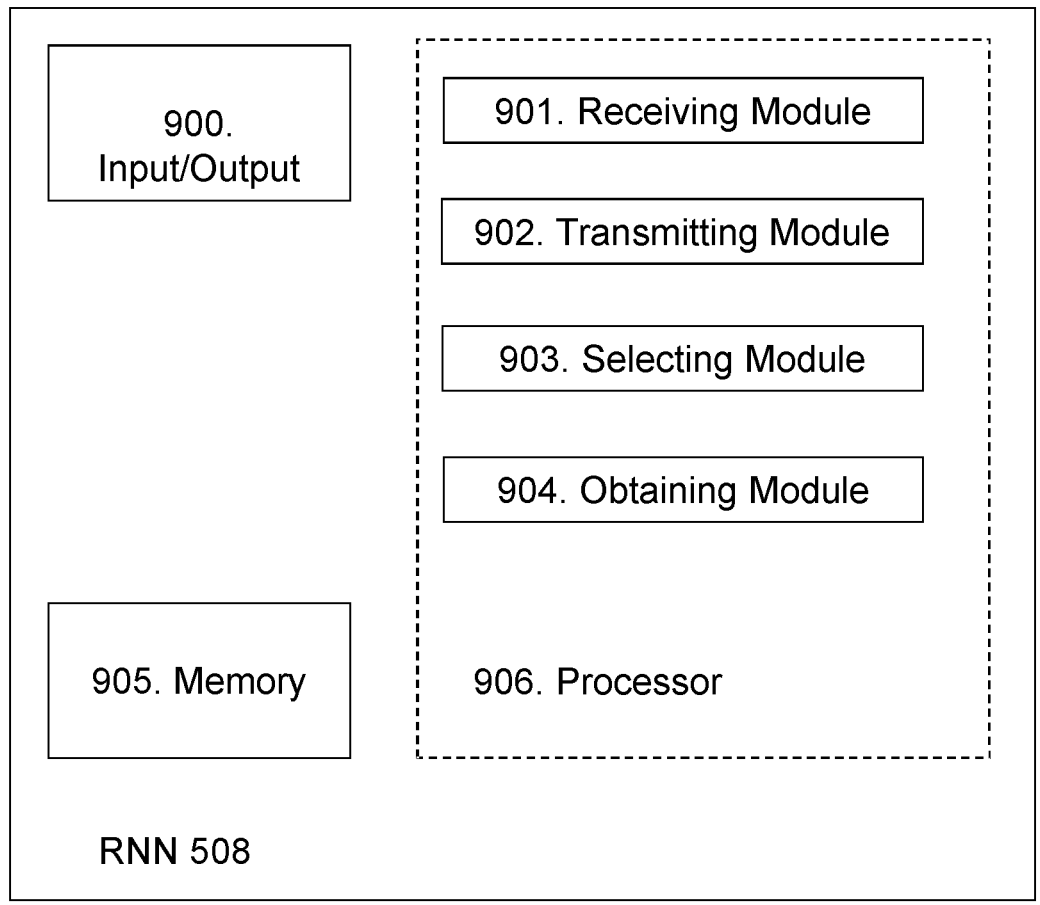
FIG. 9 is a block diagram schematically illustrating embodiments of a Radio Network Node.

To perform the method for enabling an improved reception of PRSs at the communications device 506, the RNN 508 may be configured e.g. according to an arrangement depicted in FIG. 9. As previously mentioned, the RNN 508 and the communications device 506 are operable in the wireless communications network 500.

In some embodiments, the RNN 508 comprises an input and output interface 900 configured to communicate with one or more the communications devices, e.g. the communications devices 506, and one or more network nodes, e.g. the network node 504 or a neighbour RNN (not shown). The input and output interface 900 may comprise a wireless receiver (not shown) and a wireless transmitter (not shown).

The RNN 508 is configured to receive, e.g. by means of a receiving module 901 configured to receive, transmissions from the network node 504, e.g. the E-SMLC, or from the communications device 506. The receiving module 901 may be implemented by or arranged in communication with a processor 906 of the RNN 508. The processor 906 will be described in more detail below.

The RNN 508 is configured to transmit, e.g. by means of a transmitting module 902 configured to transmit, one or more PRS symbols to the communications device 506. The transmitting module 902 may be implemented by or arranged in communication with the processor 906 of the RNN 508.

In some embodiments, the RNN 508 is configured to transmit, to the communications device 506, the one or more first PRS symbols to which the first precoder is applied. Further, and in accordance with the obtained precoding switching pattern, the RNN 508 is configured to transmit, to the communications device 506, the one or more second PRS symbols to which the second precoder is applied.

The one or more first PRS symbols and the one or more second PRS symbols may be one or more first PRS symbols and one or more second PRS symbols of a single subframe; one or more first PRS symbols of one or more first subframes and one or more second PRS symbols of one or more second subframes, respectively; or one or more first PRS symbols of one or more first PRS occasions and one or more second PRS symbols of one or more second PRS occasions, respectively.

The RNN 508 may further be configured to transmit the obtained precoding switching pattern to the communications device 506.

In some embodiments, the RNN 508 is configured to transmit an obtained precoding switching pattern to the communications device 506 by further being configured to transmit, to the communications device 506, an indication indicating one or more SFNs at which subframes a switch between the first precoder and the second precoder is to occur.

The RNN 508 may further be configured to transmit the obtained precoding switching pattern to the communications device 506 by further being configured to transmit, to the communications device 506, an indication indicating that the first precoder is to be applied to the one or more first PRS symbols and that the second precoder is to be applied to the one or more second PRS symbols.

The RNN 508 is configured to select, e.g. by means of a selecting module 903 configured to select, a first precoder and a second precoder for forming a first beam and a second beam, respectively. The selecting module 903 may be implemented by or arranged in communication with the processor 06 of the RNN 508.

In some embodiments, the RNN 508 is configured to select the first and second precoders by being configured to select the first and second precoders from a codebook predefined by the wireless communications network 500.

The RNN 508 may further be configured to select the first and second precoders by being configured to select the first and second precoders, to be used at an antenna port for forming the first and second beams, to reuse precoders used for another antenna port.

In some embodiments, the RNN 508 is configured to select the first and second precoders by being configured to select the first and second precoders based on precoder information comprised in the RNN 508 and specific for the communications device 506. The precoder information may comprise information relating to a precoder to be used in order to optimize data reception at the communications device 506.

Alternatively, the RNN 508 is configured to select the first and second precoders by being configured to select the first and second precoders based on a respective desired beam width and direction of the formed first and second beams, respectively.

The RNN 508 may be configured to obtain, e.g. by means of an obtaining module 904 configured to obtain, a precoding switching pattern relating to when the first precoder is to be applied to one or more first PRS symbols and when the second precoder is to be applied to one or more second PRS symbols. The obtaining module 904 may be implemented by or arranged in communication with the processor 906 of the RNN 508.

In some embodiments, the RNN 508 is configured to obtain the precoding switching pattern by further being configured to select the precoding switching pattern randomly or based on an order of the first and second precoders in a codebook.

The RNN 508 may be configured to obtain the precoding switching pattern by further being configured to receive the precoding switching pattern from a network node 504 operating in the wireless communications network 500. As previously mentioned, the network node 504 may be the E-SMLC.

The obtained precoding switching pattern may comprise information relating to whether or not the first and/or the second precoder for transmitting PRS symbols is used by another antenna port, e.g. used by one or more of antenna ports 1-4 in LTE instead of the antenna port 6 used for the PRSs.

The RNN 508 may also comprise means for storing data. In some embodiments, the RNN 508 comprises a memory 905 configured to store the data. The data may be processed or non-processed data and/or information relating thereto. The memory 905 may comprise one or more memory units. Further, the memory 905 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the RNN 508.

Embodiments herein for enabling an improved reception of PRSs at the communications device 506 may be implemented through one or more processors, such as the processor 906 in the arrangement depicted in FIG. 9, together with computer program code for performing the functions and/or method actions of embodiments herein. The program code mentioned above may also be provided as a computer program product, for instance in the form of a data carrier carrying computer program code for performing the embodiments herein when being loaded into the RNN 508. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the RNN 508.

Those skilled in the art will also appreciate that the input/output interface 900, the receiving module 901, the transmitting module 902, the selecting module 903, and the obtaining module 904 above may refer to a combination of analog and digital circuits, and/or one or more processors configured with software and/or firmware, e.g. stored in the memory 905, that when executed by the one or more processors such as the processors in the RNN 508 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 10:
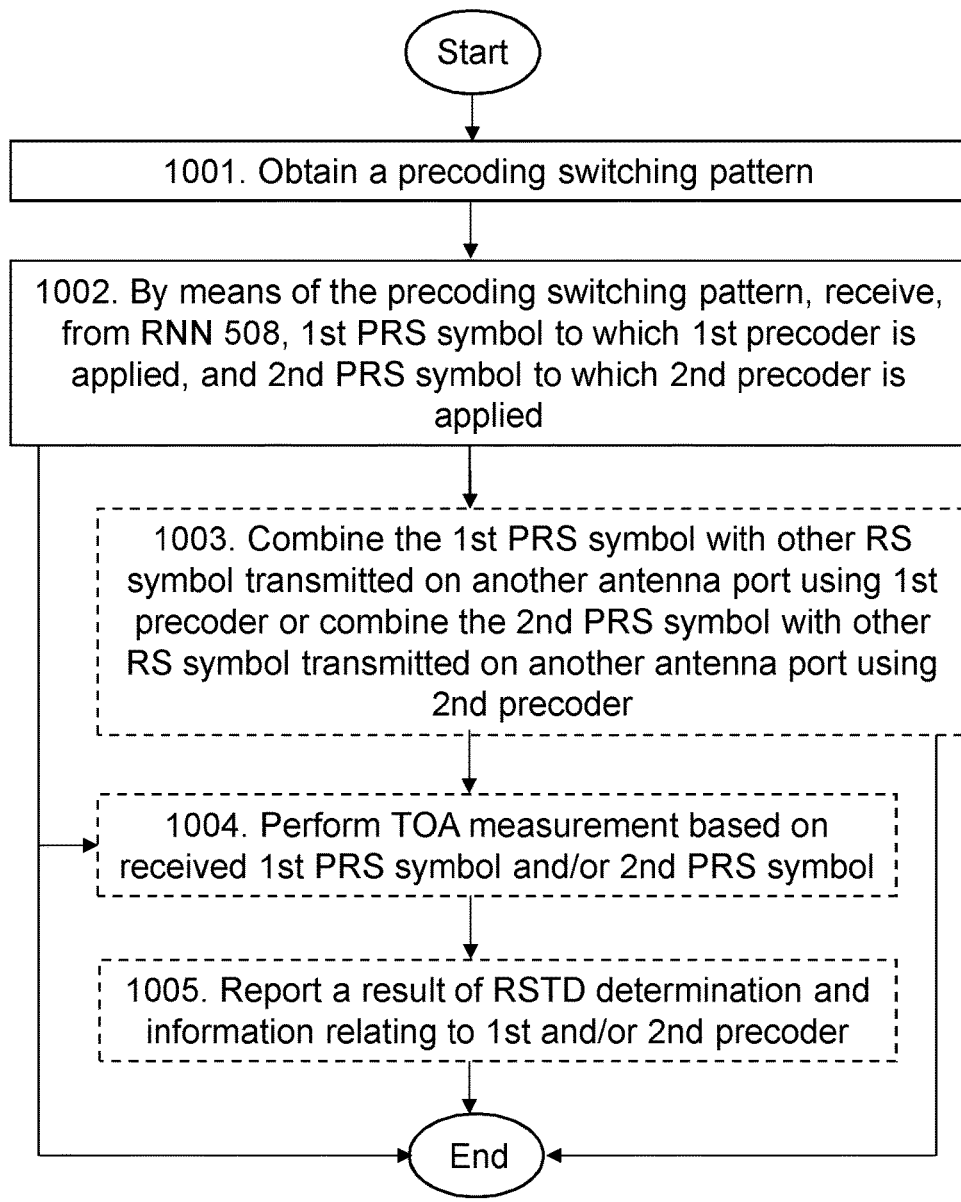
FIG. 10 is a flowchart schematically illustrating embodiments of a method performed by a communications device.

Examples of methods performed by the communications device 506 for an improved reception of PRSs at the communications device 506 will now be described with reference to flowchart depicted in FIG. 10. As previously described, the RNN 508 and the communications device 506 are operating in the wireless communications network 500.

The methods comprise one or more of the following actions. It should be understood that these actions may be taken in any suitable order and that some actions may be combined.

Action 1001

The communications device 506 obtains a precoding switching pattern. The precoding switching pattern is needed since the effective channel at the communications device 506 will change when the precoder switches. The precoding switching pattern is thus needed to indicate the possibility of coherent detection of multiple PRS subframes. The precoding switching pattern may also be useful to indicate that a cell is not hearable when one precoder is used, but it is possibly hearable when the precoder switches. Therefore the communications device 506 may continue to search for a cell even though it was not hearable when a particular precoder was used. Thus, by means of the precoding switching pattern, the communications device 506 will be able to receive one or more PRS symbols transmitted from the RNN 508, and to which one or more PRS symbols one or more precoders are applied in accordance with the obtained precoding switching pattern.

In some embodiments, the communications device 506 obtains the precoding switching pattern by receiving the precoding switching pattern from the RNN 508.

Alternatively, the communications device 506 may obtain the precoding switching pattern by determining the precoding switching pattern by estimating each channel coherence time interval. For example, this may be done by calculating an TOA estimate per channel coherence time interval, whereby the communications device 506 may detect when the channel has changed significantly. The case when the precoder has switched will thus be covered, and the communications device 506, when using the coherence time, is able to handle a precoder switch without any additional assisting data. However, for robust positioning, the precoding switching pattern is necessary. In this case, a threshold of receiving quality may be established such that the communications device 506 may abandon the TOA measurements in a time interval when the receiving quality, due to the current precoding switching pattern, is not sufficiently good for a proper positioning.

Action 1002

By means of the obtained precoding switching pattern, the communications device 506 receives from the RNN 508, one or more first PRS symbols to which a first precoder is applied, and one or more second PRS symbols to which a second precoder is applied. Since the communications device 506 has knowledge about the precoding switching pattern it will be able to receive the one or more PRS symbols transmitted from the RNN 508 and to which one or more PRS symbols one or more precoders are applied in accordance with the obtained precoding switching pattern.

The one or more first PRS symbols and the one or more second PRS symbols may be one or more first PRS symbols and one or more second PRS symbols of a single subframe; one or more first PRS symbols of one or more first subframes and one or more second PRS symbols of one or more second subframes, respectively; or one or more first PRS symbols of one or more first PRS occasions and one or more second PRS symbols of one or more second PRS occasions, respectively.

The communications device 506 may receive the precoding switching pattern from the RNN 508 by receiving, from the RNN 508, an indication indicating that the first precoder is to be applied to the one or more first PRS symbols and that the second precoder is to be applied to the one or more second PRS symbols.

Action 1003

In some embodiments, when the obtained precoding switching pattern comprises information relating to the first or the second precoder being used by another antenna port; the communications device 506 combines the one or more first PRS symbols with one or more other Reference Signal symbols transmitted on the another antenna port using the first precoder; or the communications device 506 combines the one or more 10 second PRS symbols with one or more other Reference Signal (RS) symbols transmitted on the another antenna port using the second precoder. Thus, since the same precoders may be used by different antenna ports to transmit the PRS symbols and the one or more other RS symbols, the communications device 506 may combine received PRS symbols with received one or more other RS symbols to improve the TOA estimates. The combination of PRS with other reference signals if possible, may be advantageous since additional information may never be harmful if utilized properly. For example, if the PRS and the one or more other RS have equal signal to noise level, then one may simply take an average of them. However, if the PRS has a lower noise than the one or more other RS, e.g. the PRS has a higher signal to noise than the one or more RS, then a linear combination of the PRS and the one or more other RS may be performed. In such linear combination, the PRS may get a higher weight as compared to the one or more RS having the higher noise, e.g. the lower signal to noise ratio. The weighted linearly combination of the two reference signals, e.g. of the PRS and the one or more other RS, may be used to more accurately determine the channel impulse response and to improve the TOA estimation accuracy.

Action 1004

In some embodiments, the communications device 506 performs a Time of Arrival (TOA) measurement based on the received one or more first PRS symbols and/or one or more second PRS symbols. This may be done when the communications device 506 is to determine its position.

Action 1005

In some embodiments, the communications device 506 reports based on the TOA measurement, a result of a Reference Signal Time Difference (RSTD) determination and information relating to the respective first and/or second precoder.

Based on the TOA measurement, the communications devices 506 may perform the RSTD determination. The RSTD measurement may be performed by first selecting a cell, e.g. a RNN such as the RNN 508, as reference cell, and then subtracting TOA arrival measurements of all measured cells, e.g. one or more further RNN, from the TOA measurement of the reference cell. Hence if there are N+1 measured cells, then there will be N RSTD measurements, since one cell is selected as a reference cell. The RSTD measurements may be reported to the communications network 500, e.g. to a location server, that has to mathematically solve a system of simultaneous non-linear equations to determine a position, e.g. a location or coordinates, of the communications device 506.

The communications device 506 may report the result to the network node 504, e.g. the E-SMLC, operating in the wireless communications network 500, Further, the communications device 506 may report the result of the RSTD determination, by reporting information relating to a precoding switching pattern determined to be a beneficial precoding switching pattern in terms of Signal-to-Noise Ratio (SNR) or Line-Of-Sight (LOS) detection. If N precoders are used by the RNN 508 for the transmission of the PRS, then the communications device 506 may perform N RSTD measurements or TOA measurements for one RNN, e.g. the RNN 508, or a cell for the different precoded transmissions. Some of the RSTD measurements may be of better quality, e.g. more accurate, than the other and hence the communications device 506 may report the best RSTD measurement and indicate that for which precoded PRS transmission, this measurement was performed.

The result of the RSTD determination relates to the information relating to the precoding switching pattern determined to be a beneficial precoding switching pattern in terms of Signal-to-Noise Ratio (SNR) or Line-Of-Sight (LOS) detection. A precoding pattern is beneficial from the perspective of the communications device, e.g. the communications device 506, if it allows to improve hearability of the PRS from different cells and/or enhances the chances of the LOS signal reception.

In some embodiments, the communications device 506 reports the result using a positioning protocol, such as an LTE Positioning Protocol (LPP).

Thus the communications device 506 may report the most beneficial precoding switch, e.g. the most beneficial precoder, to the network node 504. Thus, when RSTDs are reported using e.g. the LPP, the communications device 506 may also include additional information of what precoder switch that was most beneficial in terms of for example SNR or LOS detection. This information may then be used to build up knowledge of the used precoders at the network node 504, at the E-SMLC.

Figure 11:
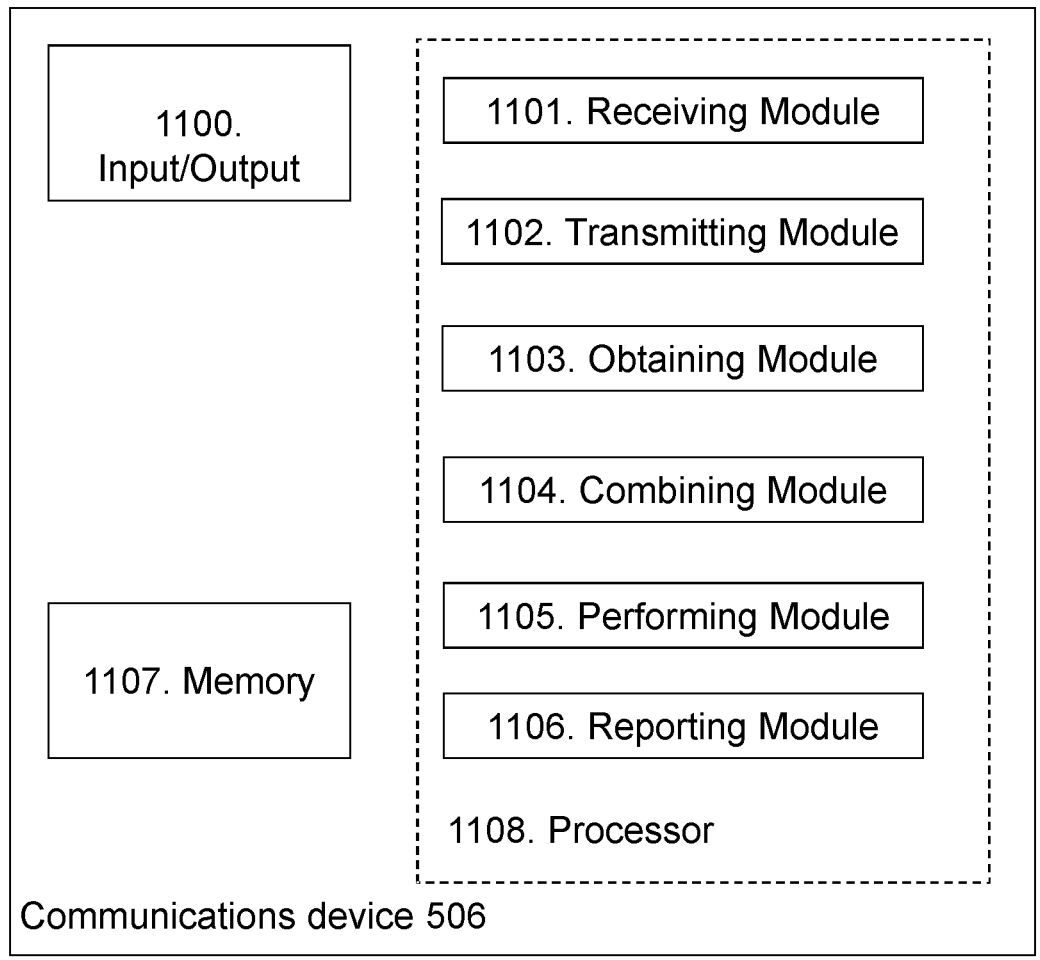
FIG. 11 is a block diagram schematically illustrating embodiments of a communications device.

To perform the method for an improved reception of PRSs at the communications device 506, the communications device 506 may be configured according to an arrangement depicted in FIG. 11. As previously mentioned, the RNN 508 and the communications device 506 are operable in the wireless communications network 500.

In some embodiments, the communications device 506 comprises an input and output interface 1100 configured to communicate with one or more the communications devices, e.g. the communications devices 506, and one or more network nodes, e.g. the network node 504 or a neighbour RNN (not shown). The input and output interface 1100 may comprise a wireless receiver (not shown) and a wireless transmitter (not shown).

The communications device 506 is configured to receive, e.g. by means of a receiving module 1101 configured to receive, one or more PRS symbols from the RNN 508. The receiving module 1101 may be implemented by or arranged in communication with a processor 1108 of the communications device 506. The processor 1108 will be described in more detail below.

By means of an obtained precoding switching pattern, the communications device 506 is configured to receive, from the RNN 508, one or more first PRS symbols to which a first precoder is applied, and one or more second PRS symbols to which a second precoder is applied.

The one or more first PRS symbols and the one or more second PRS symbols may be one or more first PRS symbols and one or more second PRS symbols of a single subframe: one or more first PRS symbols of one or more first subframe and one or more second PRS symbols of one or more second subframe, respectively; or one or more first PRS symbols of one or more first PRS occasion and one or more second PRS symbols of one or more second PRS occasion, respectively.

The communications device 506 is configured to transmit, e.g. by means of a transmitting module 1102 configured to transmit, transmissions, e.g. data or information, to the RNN 508. The transmitting module 1102 may be implemented by or arranged in communication with the processor 1108 of the communications device 506.

The communications device 506 is configured to obtain, e.g. by means of a obtaining module 1103 configured to obtain, a precoding switching pattern. The obtaining module 1103 may be implemented by or arranged in communication with the processor 1108 of the communications device 506.

In some embodiments, the communications device 506 is configured to obtain the precoding switching pattern by further being configured to receive, from the RNN 508, the precoding switching pattern.

The communications device 506 may be configured to obtain the precoding switching pattern from the RNN 508 by further being configured to receive, from the RNN 508, an indication indicating that the first precoder is to be applied to the one or more first PRS symbols and that the second precoder is to be applied to the one or more second PRS symbols.

In some embodiments, the communications device 506 is configured to obtain the precoding switching pattern by further being configured to determine the precoding switching pattern by estimating each channel coherence time interval.

The communications device 506 may be configured to combine, e.g. by means of a combining module 1104 configured to combine, one or more reference signal symbols. The combining module 1104 may be implemented by or arranged in communication with the processor 1108 of communications device 506.

In some embodiments, when the obtained precoding switching pattern comprises information relating to the first or the second precoder being used by another antenna port, the communications device 506 is configured to combine the one or more first PRS symbols with one or more other Reference Signal (RS) symbols transmitted on the another antenna port using the first precoder; or combine the one or more second PRS symbols with one or more other RS symbols transmitted on the another antenna port using the second precoder.

The communications device 506 is configured to perform, e.g. by means of a performing module 1105 configured to perform, a measurement on one or more received PRSs. The performing module 1105 may be implemented by or arranged in communication with the processor 1108 of the communications device 506.

In some embodiments, the communications device 506 is configured to perform a TOA measurement based on the received one or more first PRS symbols and/or one or more second PRS symbols.

The communications device 506 may be configured to report, e.g. by means of a reporting module 1106 configured to report, a result of a measurement. The reporting module 1106 may be implemented by or arranged in communication with the processor 1108 of communications device 506.

In some embodiments, the communications device 506 is configured to report, based on the TOA measurement, a result of an RSTD determination and information relating to the respective first and/or second precoder. The communications device 506 may be configured to report the result to a network node 504, e.g. the E-SM LC, operating in the wireless communications network 500.

The communications device 506 may be configured to report the result of the RSTD determination by further being configured to report information relating to a precoding switching pattern determined to be a beneficial precoding switching pattern in terms of SNR or LOS, detection.

In some embodiments, the communications device 506 is configured to report the result of the RSTD determination by further being configured to report the result using a positioning protocol, such as an LTE Positioning Protocol (LPP).

The communications device 506 may also comprise means for storing data. In some embodiments, the communications device 506 comprises a memory 1107 configured to store the data. The data may be processed or non-processed data and/or information relating thereto. The memory 1107 may comprise one or more memory units. Further, the memory 1107 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the communications device 506.

Embodiments herein for an improved reception of PRSs at the communications device 506 may be implemented through one or more processors, such as the processor 1108 in the arrangement depicted in FIG. 11, together with computer program code for performing the functions and/or method actions of embodiments herein. The program code mentioned above may also be provided as a computer program product, for instance in the form of a data carrier carrying computer program code for performing the embodiments herein when being loaded into the communications device 506. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the communications device 506.

Those skilled in the art will also appreciate that the input/output interface 1100, the receiving module 1101, the transmitting module 1102, the obtaining module 1103, the combining module 1104, the performing module 1105 and the reporting module 1106 above may refer to a combination of analog and digital circuits, and/or one or more processors configured with software and/or firmware, e.g. stored in the memory 1107, that when executed by the one or more processors such as the processors in the communications device 506 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Exemplary Scenarios

In the following exemplary scenarios, embodiments disclosed herein are exemplified by considering two precoders, e.g. the first precoder and the second precoder. The two precoders are selected from a pre-defined codebook, which codebook may be created using any of the described methods above. Then, in these examples, the two precoders are used in a single PRS subframe. According to FIG. 3, the PRS subframe comprises 14 OFDM symbols and it is assume that the precoder switches from the first precoder to the second precoder in the OFDM symbol number 7. In this example, the point of time t for the switch is equal to the OFDM symbol number I within the subframe. That is, the first and second precoders within the subframe are $p_0=p_1=\ldots=p_6$, and $p_7=\ldots p_8=\ldots=p_{13}$, respectively. Furthermore, note that the first precoder is different from the second precoder, i.e. that $p_{0\ldots6} \neq p_{7\ldots13}$. For simplicity, the first precoder $p_{0\ldots6}$ is denoted $p_{r1}$ and the second precoder $p_{7\ldots13}$ is denoted $p_{r2}$. Note that the switch between the first and second precoders is performed at t2 which corresponds to symbol 7 within the subframe.

First Exemplary Scenario: Reduced Static Interference at the Communications Device 506

Figure 12:
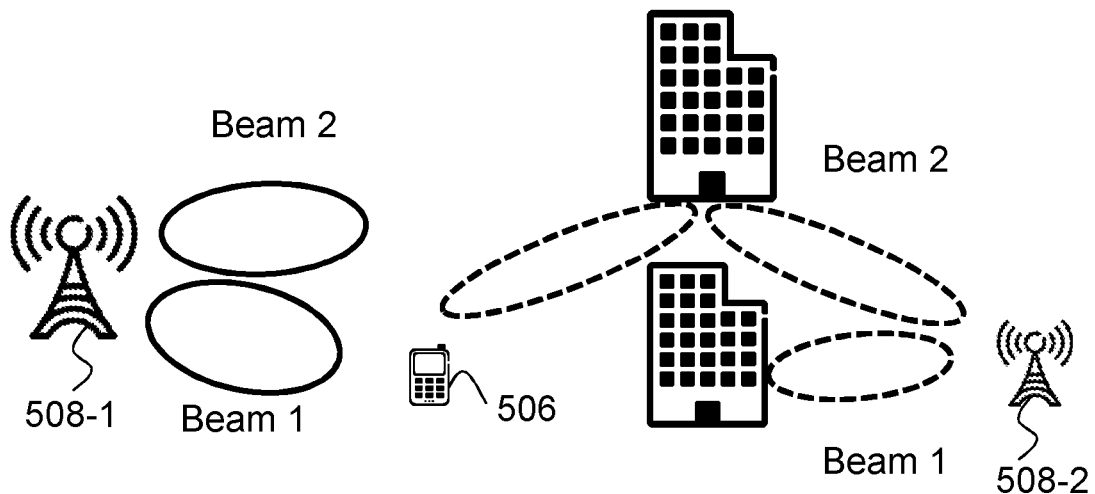
FIG. 12 schematically illustrates a first exemplary scenario exemplifying some embodiments.

This example shows how the static interference at the communications device 506 is reduced with embodiments disclosed herein. Consider the deployment scenario in FIG. 12 with two cells served by a first and second RNN 508-1, 508-2, respectively, and one communications device 506 that wants to calculate an RSTD between the first RNN 508-1 and the second RNN 508-2. Furthermore, assume that the two RNNs 508-1, 508-2 are transmitting on the same PRS time and/or frequency resources or the same resource elements as defined in LTE, and thereby create interference towards each other. Note that the first RNN 508-1 is much closer to the communications device 506 than the second RNN 508-2, and thereby the signal strength of the first RNN 508-1 is much higher than the signal strength of the second RNN 508-2. Using the two precoders, the beams spatial directions are schematically illustrated in FIG. 7, wherein the Beam 1 corresponds to using the first precoder $p_{r1}$ and Beam 2 corresponds to using the second precoder $p_{r2}$. The communications device 506 may calculate an accurate Time Of Arrival (TOA) to the first RNN 508-1 due to its high signal strength, but Beam 1 from the second RNN 508-2 is not hearable due to for example the heavy interference from Beam 1 at the first RNN 508-1, scattering and due to the blocking building located between the second RNN 508-2 and the communications device 506. When the precoder switches at the second point of time t2, the two RNNs 508-1, 508-2 switches to generate a respective Beam 2. In this case, the signal strength of Beam 2 from the first RNN 508-1 is reduced due to the beam direction, while Beam 2 from the second RNN 508-2 will be hearable due to its more preferable beam selection and since the interference from the first RNN 508-1 is reduced. The communications device 506 may now detect the second RNN 508-2, and calculate the RSTD between the first and second RNN 508-1,508-2 and thereby increase the positioning performance. Optionally, the communications device 506 may transmit an indication that the switch to the second precoder at the second point of time t2 was the most beneficial precoder in order to hear the second RNN 508-2. This information may be used by a network node, e.g. the E-SMLC, for optimizing the precoding switching pattern.

Second Exemplary Scenario: Enhanced Line of Signal (LOS) Path

Figures 13A, 13B:
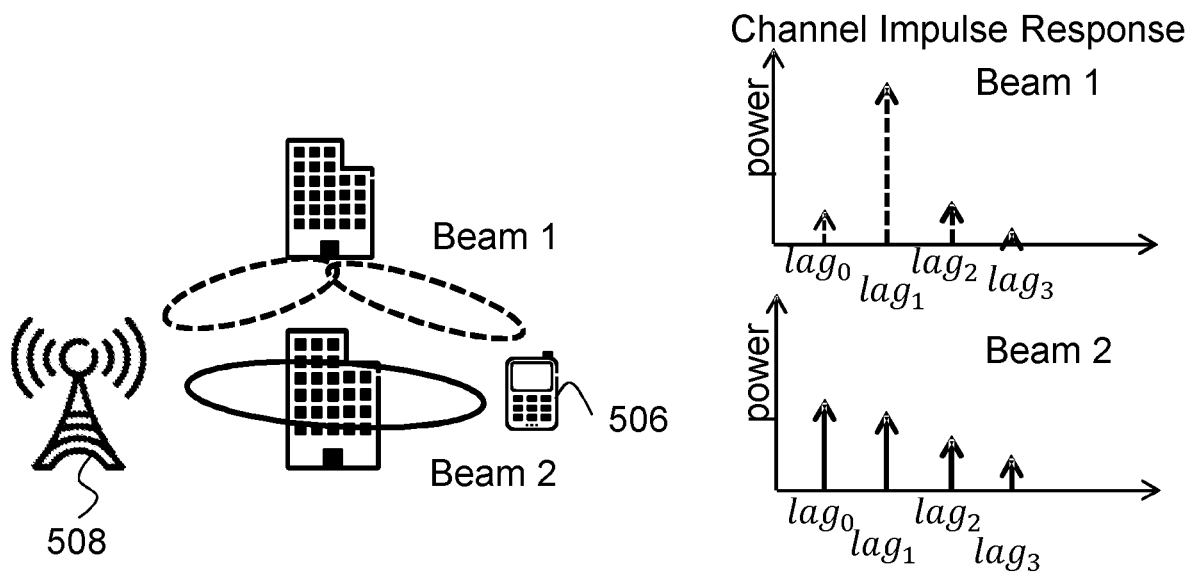
FIGS. 13A and 13B schematically illustrates a second exemplary scenario exemplifying some embodiments.

This example shows the possibility of enhancing the LOS path when using a precoding switching pattern. In this example, using the first and second precoders $p_{r2}$, the beams spatial direction is according to FIG. 13A. FIG. 13B also shows the channel impulse response with the two beams Beam 1, Beam 2, and illustrates how the LOS component, denoted lag 0, gets enhanced when using the second beam Beam 2. The use of multiple precoders thus increase the probability of LOS signal detection, e.g. LOS signal reception, and thus provide an opportunity to determine the TOA more accurately. Since the precoding switching pattern is signaled to the communications device 506, the communications device 506 may make use of this in the time estimation algorithm. For example, the communications device 506 should enable its procedure for a non-coherent TOA estimation combination when the precoder switches.

Optionally, the communications device 506 reports, e.g. to the network node 504, that the precoder switch at t2 is optimal for LOS detection.

Third Exemplary Scenario: Possibility to Detect a Weak Cell

Figure 14:
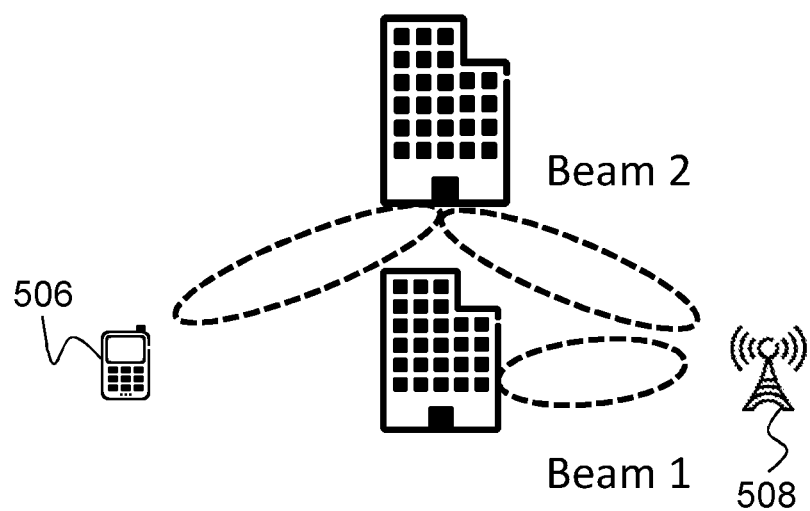
FIG. 14 schematically illustrates a third exemplary scenario exemplifying some embodiments.

This example shows how the precoding is beneficial for far-away cells, e.g. for RNNs, e.g. the RNN 508, located far away from the communications device, e.g. the communications device 506. The precoding may increase the possibility of detecting a transmission, e.g. the second beam Beam2, from the far away located RNN due to the beamforming gain, which is shown in FIG. 14. Even though there is no interference from any other cell, a cell might not be hearable due to e.g. large distance between the communications device 506 and the RNN 508, but with a proper precoding, it could be hearable. Note that even though the LOS path is not detected in this example, the communications device 506 may still get rough TOA estimate of the cell, which is beneficial in the final positioning estimation.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a Radio Network Node, RNN, for enabling an improved reception of Positioning Reference Signals, PRSs, at a communications device, wherein the RNN and the communications device are operating in a wireless communications network, and wherein the method comprises:
selecting a first precoder and a second precoder for forming a first beam and a second beam, respectively;
obtaining a precoding switching pattern relating to when the first precoder is to be applied to one or more first PRS symbols, and when the second precoder is to be applied to one or more second PRS symbols by selecting the precoding switching pattern randomly;
transmitting, to the communications device, the one or more first PRS symbols to which the first precoder is applied; and
in accordance with the obtained precoding switching pattern, transmitting, to the communications device, the one or more second PRS symbols to which the second precoder is applied.

2. The method of claim 1, further comprising:
transmitting the obtained precoding switching pattern to the communications device.

3. The method of claim 1, wherein the selecting of the first and second precoders comprises:
selecting the first and second precoders from a codebook predefined by the wireless communications network.

4. The method of claim 1, wherein the selecting of the first and second precoders comprises:
selecting the first and second precoders, to be used at an antenna port for forming the first and second beams, to reuse precoders used for another antenna port.

5. The method of claim 1, wherein the selecting of the first and second precoders comprises:
selecting the first and second precoders based on precoder information comprised in the RNN and specific for the communications device, wherein the precoder information comprises information relating to a precoder to be used in order to optimize data reception at the communications device; or
selecting the first and second precoders based on a respective desired beam width and direction of the formed first and second beams, respectively.

6. A Radio Network Node, RNN, for enabling an improved reception of Positioning Reference Signals, PRSs, at a communications device, wherein the RNN and the communications device are operable in a wireless communications network, and wherein the RNN comprising:
a processor; and
a memory, the memory containing instructions executable by the processor, whereby the processor of radio network node is operative to:
select a first precoder and a second precoder for forming a first beam and a second beam, respectively;
obtain a precoding switching pattern relating to when the first precoder is to be applied to one or more first PRS symbols, and when the second precoder is to be applied to one or more second PRS symbols by selecting the precoding switching pattern randomly;
transmit, to the communications device, the one or more first PRS symbols to which the first precoder is applied; and
in accordance with the obtained precoding switching pattern, transmit, to the communications device, the one or more second PRS symbols to which the second precoder is applied.

7. The RNN of claim 6, further being configured to:
transmit the obtained precoding switching pattern to the communications device.

8. The RNN of claim 6, wherein the RNN is configured to select the first and second precoders by being configured to:
select the first and second precoders from a codebook predefined by the wireless communications network.

9. The RNN of claim 6, wherein the RNN is configured to select the first and second precoders by being configured to:
select the first and second precoders, to be used at an antenna port for forming the first and second beams, to reuse precoders used for another antenna port.

10. The RNN of claim 6, wherein the RNN is configured to select the first and second precoders by being configured to:
select the first and second precoders based on precoder information comprised in the RNN and specific for the communications device, wherein the precoder information comprises information relating to a precoder to be used in order to optimize data reception at the communications device; or
select the first and second precoders based on a respective desired beam width and direction of the formed first and second beams, respectively.

11. A method performed by a communications device for improved reception of Positioning Reference Signals, PRSs, wherein the communications device and a RNN are operating in a wireless communications network, and wherein the method comprises:
obtaining, a precoding switching pattern, wherein the precoding switching pattern is randomly selected; and
by means of the obtained precoding switching pattern, receiving, from the RNN, one or more first PRS symbols to which a first precoder is applied, and one or more second PRS symbols to which a second precoder is applied.

12. The method of claim 11, wherein the obtaining of the precoding switching pattern comprises:
   receiving, from the RNN, the precoding switching pattern.

13. The method of claim 12, wherein the receiving of the precoding switching pattern from the RNN comprises:
   receiving, from the RNN, an indication indicating that the first precoder is to be applied to the one or more first PRS symbols and that the second precoder is to be applied to the one or more second PRS symbols.

14. The method of claim 11, wherein the obtaining of the precoding switching pattern comprises:
   determining the precoding switching pattern by estimating each channel coherence time interval.

15. A communications device for improved reception of Positioning Reference Signals, PRSs, wherein the communications device and a RNN are operable in a wireless communications network, and wherein the communications device comprising:
   a processor; and
   a memory, the memory containing instructions executable by the processor, whereby the processor of communication device is operative to:
      obtain a precoding switching pattern, wherein the precoding switching pattern is randomly selected; and
      by means of the obtained precoding switching pattern, receive, from the RNN, one or more first PRS symbols to which a first precoder is applied, and one or more second PRS symbols to which a second precoder is applied.

16. The communications device of claim 15, wherein the communications device is configured to obtain the precoding switching pattern by further being configured to:
   receive, from the RNN, the precoding switching pattern.

17. The communications device of claim 16, wherein the communications device is configured to obtain the precoding switching pattern from the RNN by further being configured to:
   receive, from the RNN, an indication indicating that the first precoder is to be applied to the one or more first PRS symbols and that the second precoder is to be applied to the one or more second PRS symbols.

18. The communications device of claim 15, wherein the communications device is configured to obtain the precoding switching pattern by further being configured to:
   determine the precoding switching pattern by estimating each channel coherence time interval.

* * * * *